(12) United States Patent
Brestelli et al.

(10) Patent No.: US 6,871,841 B2
(45) Date of Patent: Mar. 29, 2005

(54) APPARATUS FOR SUPPORTING A SPARE TIRE AND WHEEL ASSEMBLY ON A MOTOR VEHICLE

(75) Inventors: Fernando M. Brestelli, Waynesville, OH (US); Paul J. Rado, Jr., Franklin, OH (US)

(73) Assignee: Deuer Manufacturing Inc., Dayton, OH (US)

( * ) Notice: Subject to any disclaimer, the term of this patent is extended or adjusted under 35 U.S.C. 154(b) by 0 days.

(21) Appl. No.: 10/688,693

(22) Filed: Oct. 20, 2003

(65) Prior Publication Data

US 2004/0089857 A1 May 13, 2004

Related U.S. Application Data

(60) Provisional application No. 60/424,281, filed on Nov. 6, 2002.

(51) Int. Cl.$^7$ ................................................. B66D 1/00
(52) U.S. Cl. ..................... 254/323; 254/389; 224/42.23
(58) Field of Search ................................ 254/323, 389, 254/269, 270; 224/42.12, 42.21, 42.23

(56) References Cited

U.S. PATENT DOCUMENTS

| | | |
|---|---|---|
| 4,884,785 A | 12/1989 | Denman et al. |
| 5,290,014 A | 3/1994 | Fergison, Jr. |
| 6,406,000 B1 * | 6/2002 | Raz et al. .................... 254/323 |
| 6,435,479 B1 * | 8/2002 | Raz et al. .................... 254/323 |

* cited by examiner

Primary Examiner—Emmanuel Marcelo
(74) Attorney, Agent, or Firm—Jacox, Meckstroth & Jenkins

(57) ABSTRACT

A tire lift winch unit includes a depending cable connected through a plastic bushing to an adapter supporting a spare tire and wheel assembly for movement between an elevated stored position an a lower ground engaging position. A secondary support system includes a tubular support bracket enclosing a tubular shell and latch mechanism with a latch body supporting retractable latch blades biased by corresponding springs confined with opposing slots within the latch body and blades. The shell depends from the latch body and has a bottom flange supporting a conical washer engaging the adapter, and a tubular latch release pin extends within the shell. A conical compression spring biases the latch system downwardly within the support bracket to hold the blades retracted for clearing the bracket when the tire and wheel assembly are removed from the adapter.

15 Claims, 2 Drawing Sheets

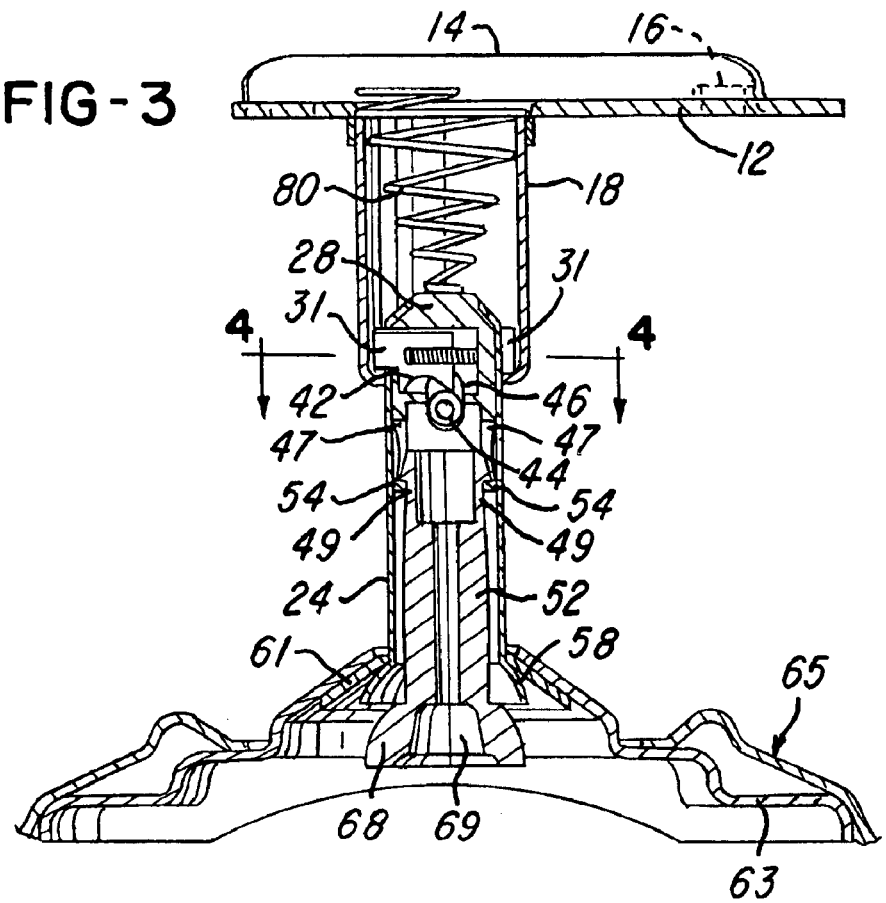
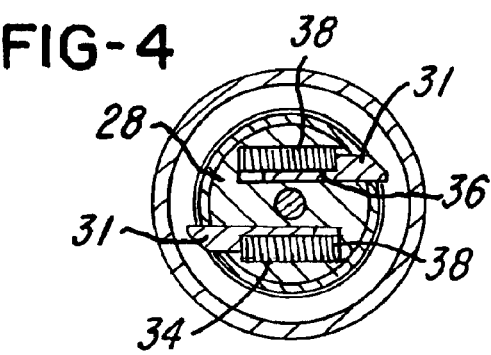
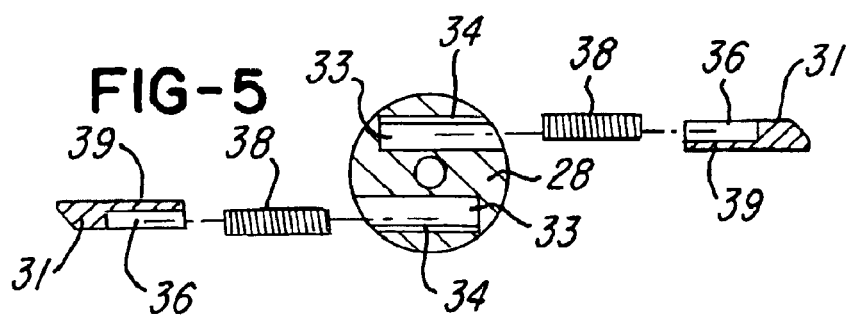

APPARATUS FOR SUPPORTING A SPARE TIRE AND WHEEL ASSEMBLY ON A MOTOR VEHICLE

BACKGROUND OF THE INVENTION

This invention relates to improvements in the apparatus disclosed in U.S. Pat. No. 4,884,785 which issued to the assignee of the present invention, and the disclosure of which is herein incorporated by reference. The apparatus is used with a tire lift/carrier unit or hoist of the type disclosed in U.S. Pat. No. 5,290,014 which also issued to the assignee of the present invention and the disclosure of which is hereby incorporated by reference. In such apparatus, it is desirable to minimize lateral movement of the stored spare tire and wheel assembly in the event of a sudden shock or impact to the motor vehicle. It is also desirable to provide a secondary support mechanism or apparatus which is simple and dependable in construction and operation and which provides for moving the support bracket for the spare tire and wheel assembly between its retracted and extended positions when the assembly has been removed for use or repair. Also, in the event the lift unit fails or the cable breaks, and the secondary support system or mechanism becomes effective to support the tire and wheel assembly in an elevated position, it is desirable to provide for conveniently releasing the spare tire and wheel assembly for lowering and removing the assembly from the vehicle.

SUMMARY OF THE INVENTION

The present invention is directed to an improved secondary support system or apparatus for use with a tire lift/carrier unit and which provides all of the desirable advantages mentioned above. In accordance with a preferred embodiment of the invention, the secondary support system or apparatus for the spare tire and wheel assembly includes a rigid tubular support bracket or canister which is rigidly secured or welded to a mounting bracket for attachment to the tire lift/carrier unit and to the vehicle chassis. The tubular support bracket receives a tubular shell which encloses a latch mechanism through which extends the support cable in a manner as disclosed in the above '785 patent.

The tubular shell also encloses a tubular release plunger or pin which provides for manually releasing the latch mechanism in the event the support cable breaks or the hoist fails and the latch mechanism supports the tire and wheel assembly in a loose elevated position. The tubular support bracket also encloses a tapered compression spring which engages the latch mechanism and permits full extension and retraction of the support cable and adapter plate in response to operation of the tire lift/carrier unit when no spare tire and wheel assembly is being supported by the cable.

Other features and advantages of the invention will be apparent from the following description and the accompanying drawings.

BRIEF DESCRIPTION OF THE DRAWINGS

FIG. 3 is an axial section of the apparatus in a position showing the support of the tire and wheel assembly after a cable has broken;

FIG. 4 is a radial section taken generally on the line 4—4 of FIG. 3 to show components of the assembled latch mechanism; and FIG. 5 is an exploded view of the latch components shown assembled in FIG. 4.

DESCRIPTION OF THE PREFERRED EMBODIMENT

Figure 1:
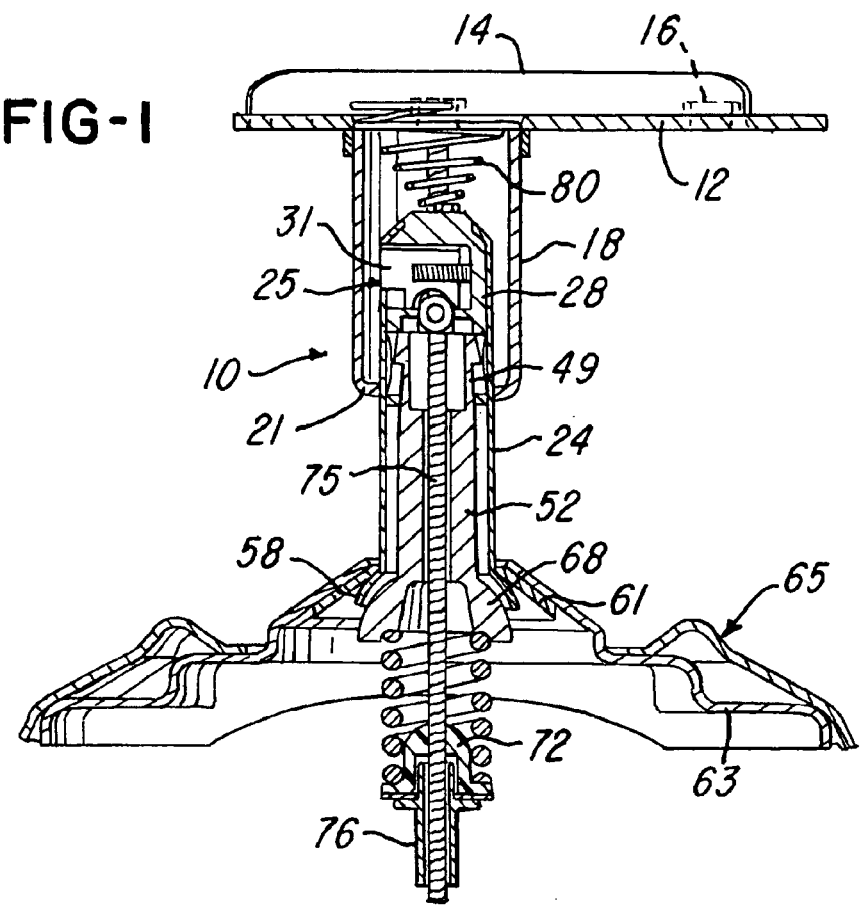
FIG. 1 is a vertical axial section through an improved secondary support apparatus constructed in accordance with the invention for supporting a spare tire and wheel assembly in its elevated stored position.

FIG. 1 shows a secondary support system 10 which includes a mounting plate 12 adapted to be secured to the frame or chassis of a motor vehicle and which has an integrally formed stiffening or strengthening rib or flange 14 and one or more upwardly projecting extruded tubular bosses 16 for locating and supporting a compact tire lift/carrier unit of the type shown in the above-mentioned '014 patent. A tubular support bracket or canister 18 has an upper end portion welded to the mounting plate 12 and a lower annular lip portion 21 which projects inwardly and slidably receives a smaller tubular support member or shell 24 constructed similar to the tubular shell disclosed in the above-mentioned '785 patent.

The upper end portion of the shell 24 encloses a latch device or mechanism 25 having a latch body 28 which is preferably molded of a plastic material. The upper end portion of the latch body 28 encloses or receives a pair of latch elements or blades 31 which project laterally from corresponding slots 33 within the latch body 28. Each of the slots 33 has a laterally extending and part-cylindrical slot 34, and each of the latch blades 31 has a part-cylindrical slot 36. Each set of opposing part-cylindrical slots 34 and 36 receives a corresponding compression spring 38, and each of the latch blades has a strengthening wall 39. The bottom portion of each latch blade 31 has a cam-shaped cavity or recess 42 which is engaged by an actuating cross pin 44 confined within a vertically extending slot 46 within the latch body, in a manner similar to that shown in the above '785 patent.

The latch body 28 has a lower tubular portion having a pair of diametrically opposed slots 47 (FIG. 3) which receive a corresponding pair of spring fingers or tabs 49 molded within an upper end portion of a tubular release plunger or pin 52 confined within the shell 24. The release pin 52 is supported within the shell 24 by a pair of diametrically opposed steps 54 formed at the bottom of the slots 47 for engaging the hook-shaped spring tabs 47. Thus the pin 52 is moveable axially within the latch body 28 by the length of the slots 47.

The lower end portion of the metal shell 24 has an outwardly projecting and part-spherical flange 58 supporting a conical washer 61 which, in turn, supports the hub portion of an adapter plate 63 adapted to extend through the center hole of a spare tire and wheel assembly 65. The release pin 52 has a lower bell-shaped end portion 68 defining a cavity 69 for receiving a molded plastic tubular bushing 72 surrounding a lower end portion of a flexible cable 75 extending downwardly from the tire lift/carrier unit. A metal stop fitting 76 is crimped to the lower end portion of the cable 75 below the bushing 72 so that the cable 75 normally supports the adapter plate 63 and the tire and wheel assembly 65.

A tapered or conical compression spring 80 is enclosed within the tubular support bracket or canister 18 and has an upper end portion which connects with the plate 12 under the bottom of the tire lift/carrier unit. The smaller lower end of the spring 80 engages the upper end of the latch body 28, as best shown in FIG. 3.

In operation of the apparatus shown in FIGS. 1–5, when a spare tire and wheel assembly 65 is in its normally elevated stored position and supported by the cable 75, the secondary latch system 10 is in the position shown in FIG. 1 with the latch elements or blades 31 in their retracted positions as a result of the upward force applied to the latch blades by the cross-pin 44 secured to the cable 75, in a manner as described in the above '785 patent. In the event the tire lift/carrier unit fails or the cable 75 breaks, the tire and wheel assembly 65 drops slightly during which time the latch blades 31 are projected outwardly by the springs 38 to engage the bottom lip 21 on the support bracket or canister 18. Thus the assembly 65 is prevented from dropping to the road surface. However, since the assembly 65 is released from pressing against the vehicle chassis, the slight tilting movement of the assembly provides sufficient noise in the vehicle to indicate that the assembly is loose.

Figure 2:
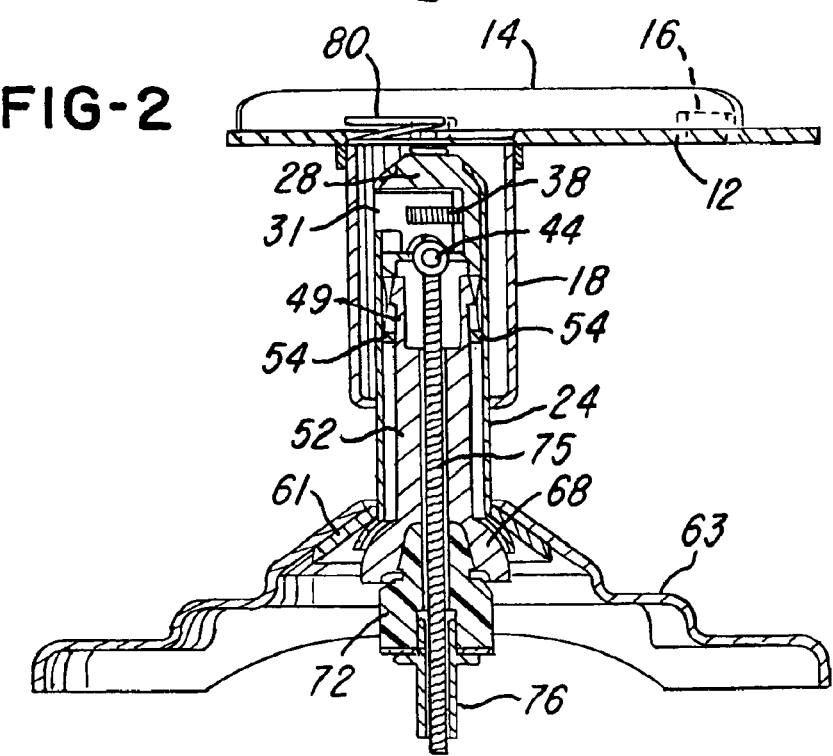
FIG. 2 is a section similar to FIG. 1 and showing the apparatus in its retracted or stored position without a tire and wheel assembly and without the bottom compression spring shown in FIG. 1.

When it is desired to remove the tire and wheel assembly 65 from the secondary support system, an upward pressure is exerted on the release plunger or pin 52 (FIG. 3) in order to shift the cross-pin 44 upwardly to cam the latch blades 31 inwardly and thereby release the shell 24 from the canister 18. While the spare tire and wheel assembly 65 is removed from the vehicle for either use or repair, it is desirable to retract the adapter plate 63 to an elevated stored position as shown in FIG. 2. When the cable 75 is retracted by actuating the tire lift/carrier unit, the tapered compression spring 80 is compressed so that it applies a predetermined force downwardly on the upper end of the latch body 28. This force is sufficient to hold the latch blades 31 in their retracted positions (FIG. 2) without the weight of the spare tire and wheel assembly 65. Thus when the cable 75 is extended downwardly for reconnecting or reattaching the assembly 65, the latch blades 31 remain in their retracted positions as a result of the downward force exerted by the spring 80 until the latch blades clear the support lip 21 on the tubular support bracket or canister 18. After the tire and wheel assembly 65 is reconnected or mounted on the support adapter plate 63, the weight of the assembly 65 and the downward force or loading on the cable 75 is sufficient to maintain the latch blades 31 in their retracted positions, as shown in FIG. 1.

An advantage offered by the construction of the latch body 28 and latch blades 31, as shown in FIGS. 4 & 5, is that each of the compression latch springs 38 is confined within opposing part-cylindrical slots 34 & 36 within the latch body 28 and latch blade 31, respectively. As a result, the latch blades 31 have the strengthening wall 39 which provides the latch blades 31 with more impact resistance when the latch mechanism drops from the position shown in FIG. 1 to the engaging position shown in FIG. 3. Preferably, the latch blades 31 are formed of metal, and the latch body 28 and the release plunger or pin 52 are each molded of a plastics material. The other components of the secondary support system 10 are also formed of metal. The rigid tubular support bracket 18 also limits or restricts lateral movement of the tire and wheel assembly 65 in the event the vehicle receives an impact or shock or stops quickly.

While the forms of securing apparatus herein described constitute preferred embodiments of the invention, it is to be understood that the invention is not limited to these precise forms of apparatus, and that the changes may be made therein without departing from the scope and the spirit of the invention as defined in the appended claims.

What is claimed is:

1. Apparatus for securing a spare tire and wheel assembly in an elevated stored position under a vehicle body, said apparatus comprising a tire lift unit including a depending flexible cable having a lower end portion connected to an adapter for supporting said assembly, said cable extending and retracting in response to actuating said tire lift unit for moving said assembly between said elevated stored position and a lower ground engaging position, a secondary support independent of said cable for supporting said assembly in an elevated position spaced above the ground, said secondary support including a support bracket adapted to be connected to the vehicle body, a latch mechanism including a latch member movable between a retracted released position and an extended engaged position engaging said bracket in response to a change in tension in said cable when said cable fails to support said assembly in said stored position, and a spring biasing said latch mechanism and said latch member to said retracted released position for a predetermined movement of said cable from said stored position to permit raising and lowering of said cable and said adapter to and from said stored position when said assembly is removed from said adapter.

2. Apparatus as defined in claim 1 wherein said spring comprises a tapered coil spring disposed within said bracket above said latch mechanism.

3. Apparatus as defined in claim 1 wherein said latch member comprises a generally flat latch blade supported for lateral sliding movement within a latch body, opposing slots within said latch body and said latch blade, and a compression spring extending within said opposing slots for biasing said latch blade to said engaged position.

4. Apparatus as defined in claim 3 wherein said latch blade includes a wall portion defining said slot within said blade to provide said latch blade with substantial impact strength.

5. Apparatus as defined in claim 1 and including a latch release tube surrounding said cable and extending through said adapter, and said tube is manually movable for moving said latch member to said released position after said cable fails to support said assembly.

6. Apparatus as defined in claim 5 and including a tubular bushing of plastics material and mounted on said cable, and said bushing supports said latch release tube on said cable.

7. Apparatus as defined in claim 6 and including a compression spring surrounding said cable and extending between said bushing and said latch release tube.

8. Apparatus as defined in claim 1 wherein said latch mechanism includes a tubular shell surrounding said cable and having a laterally outwardly projecting bottom flange, a conical washer mounted on said flange, and said adapter is mounted on said washer.

9. Apparatus for securing a spare tire and wheel assembly in an elevated stored position under a vehicle body, said apparatus comprising a tire lift unit including a depending flexible cable having a lower end portion connected to an adapter for supporting said assembly, said cable extending and retracting in response to actuating said tire lift unit for moving said assembly between said elevated stored position and a lower ground engaging position, a secondary support independent of said cable for supporting said assembly in an elevated position spaced above the ground, said secondary support including a support bracket adapted to be connected to the vehicle body, a latch mechanism including a latch member movable between a retracted released position and an extended engaged position engaging said bracket in response to a change in tension in said cable when said cable fails to support said assembly in said stored position, said latch member including a generally flat latch blade supported for lateral sliding movement within a latch body, opposing slots within said latch body and said latch blade, and a compression spring extending within said opposing slots for biasing said latch blade to said engaged position.

10. Apparatus as defined in claim 9 wherein said latch blade includes a wall portion defining said slot within said blade to provide said latch blade with substantial impact strength.

11. Apparatus as defined in claim 9 and including a latch release tube surrounding said cable and extending through said adapter, and said tube is manually movable for moving said latch member to said released position after said cable fails to support said assembly.

12. Apparatus as defined in claim 11 and including a tubular bushing of plastics material and mounted on said cable, and said bushing supports said latch release tube on said cable.

13. Apparatus as defined in claim 12 and including a compression spring surrounding said cable and extending between said bushing and said latch release tube.

14. Apparatus as defined in claim 9 wherein said latch mechanism includes a tubular shell surrounding said cable and having a laterally outwardly projecting bottom flange, a conical washer mounted on said flange, and said adapter is mounted on said washer.

15. Apparatus as defined in claim 9 and including a compression spring disposed within said bracket above said latch mechanism for exerting a predetermined force downwardly on said latch mechanism.

* * * * *